(No Model.)
A. AU.
VELOCIPEDE.
No. 509,787.  Patented Nov. 28, 1893.
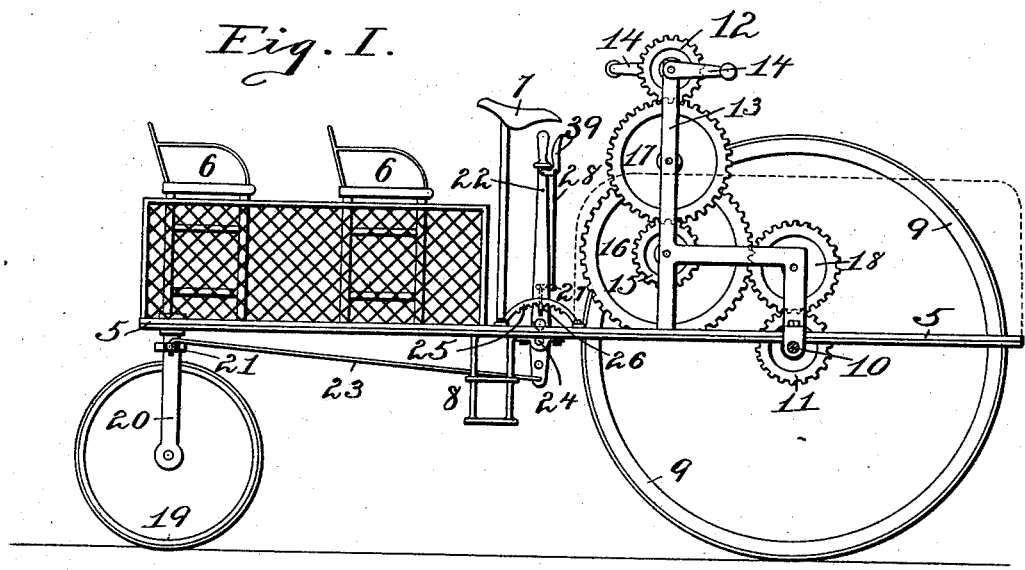
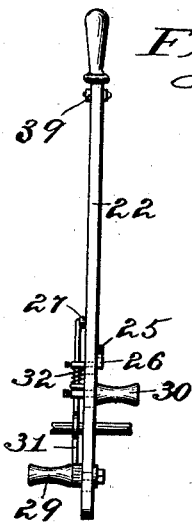
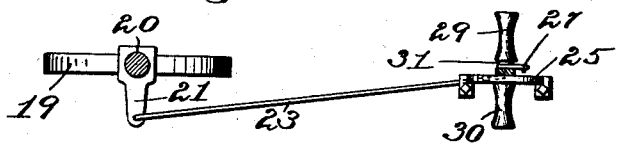
WITNESSES,
Walter Framariss,
M. C. Hillyard.
INVENTOR.
Alfred Au.
By W. L. Stevens, Atty.

UNITED STATES PATENT OFFICE.

ALFRED AU, OF CRANDON, SOUTH DAKOTA.

VELOCIPEDE.

SPECIFICATION forming part of Letters Patent No. 509,787, dated November 28, 1893.

Application filed June 29, 1893. Serial No. 479,129. (No model.)

*To all whom it may concern:*

Be it known that I, ALFRED AU, a citizen of the United States, residing at Crandon, in the county of Spink and State of South Dakota, have invented certain new and useful Improvements in Velocipedes; and I do hereby declare the following to be a full, clear, and exact description of the invention, such as will enable others skilled in the art to which it appertains to make and use the same.

This invention relates that class of velocipedes usually termed tricycles, and its object is to provide means for steering the same by either hand or foot.

To this end my invention consists in the construction and combination of parts forming a tricycle, hereinafter described and claimed, reference being had to the accompanying drawings, in which—

Figure I, is a side elevation of a tricycle according to my invention. Fig. II, is a rear side view of the steering lever. Fig. III, is a top or plan view of the steering apparatus.

5 is the frame of the machine which may be provided with any suitable seats 6 for passengers; a seat 7 for the propeller, and a step 8 by which to mount.

9 represents a pair of drive wheels upon a shaft 10 arranged for one or both of the wheels to be revolved by the shaft, and the shaft is journaled in bearings in the frame 5.

11 is the pinion wheel fixed upon the shaft 10.

12 is the primary drive wheel journaled in an attachment 13 of the frame and provided with a crank or cranks 14 whereby the propeller may turn the wheel.

15 is a pinion wheel and 16 a spur wheel both fixed upon the same shaft and journaled in the frame.

17 is a gear wheel intermediate between the drive wheel 12 and the pinion 15, and 18 is a gear wheel between the spur wheel 16 and the driven wheel 11. The ratio between the sizes of the wheels 11 and 12, and 15 and 16, may be such as to give the machine the required speed by establishing a certain ratio of revolutions between the wheels 9 and the crank 14.

19 is a steering wheel journaled in a fork 20 which is pivoted vertically in the frame 5, and is provided with an arm 21 connected with the guiding lever 22 by means of a rod 23. The lever 22 is pivoted to the frame at 24. By pulling this lever backward the wheel 19 will be set to guide the machine to run to the right, and by pushing it forward the machine will be guided to run to the left.

25 is an arc of teeth fixed to the frame 5, and 26 is a latch hung upon the lever 22 to engage the teeth 25 and to hold the lever in any forward or backward position required.

27 is a lever pivoted to the steering lever 22 and located about at right angles therewith, one end resting upon the latch 26 and the other end connected by means of a rod 28 with the latch handle 39. This latch handle is so located relative to the handle of lever 22 that both may be grasped at once, and so grasping the two handles operates the latch handle 39 and lever 27 to disengage the latch 26 from the teeth 25 and when thus disengaged the lever 22 may be moved either forward or backward. When released the latch 26 will be engaged with the nearest tooth by means of a spring 32, holding the lever and the wheel 19 set to run in the direction last given.

29 and 30 represent pedals or foot cranks connected together by a rod 31 and fitted to slide a little vertically upon the lever 22, and also connected with the latch 26 whereby downward pressure upon either pedal 29 or 30 will disengage the latch and permit the lever 22 to be moved either forward or backward by means of the feet of the propeller. If he should desire to work both hands all the time upon the cranks 14 he may press one foot upon a pedal disengaging the lever 22 and he may either push or pull by means of the pedal so as to guide the machine as desired, or he may place both feet permanently upon the pedals when their weight will disengage the lever latch and permit them to guide the machine at any time. Thus this machine may be guided either by hand or foot, or it may be left set to run either in circles or in a straight line.

Having thus fully described my invention, what I believe to be new, and desire to secure by Letters Patent, is the following:

1. The combination in velocipedes, of a frame, a steering wheel therein; a steering lever connected with the wheel and provided with a spring latch; teeth fixed to the frame in the path of the said latch; and a pair of pedals connected with the lever and latch whereby the same may be operated by foot, substantially as described.

2. The combination in a velocipede, of a frame; a steering wheel therein; a steering lever connected with the wheel and provided with a spring latch; teeth fixed to the frame in the path of the latch; a pair of pedals connected with the lever and latch; and a handle for the latch upon the lever, substantially as described.

In testimony whereof I affix my signature in presence of two witnesses.

ALFRED AU.

Witnesses:
JOHN J. HAGMANN,
ANTON AU.